UNITED STATES PATENT OFFICE.

THOMAS MILLEN, OF SYRACUSE, NEW YORK.

IMPROVEMENT IN ARTIFICIAL STONE.

Specification forming part of Letters Patent No. 150,178, dated April 28, 1874; application filed January 19, 1874.

*To all whom it may concern:*

Be it known that I, THOMAS MILLEN, of Syracuse, New York, have invented certain Improvements in Artificial Stone, of which the following is a specification:

Numerous methods have been essayed to manufacture a durable stone out of hydraulic cement and other materials, by processes more or less complex; but none have given such perfect results as to be universally adopted, from want of efficiency or cheapness.

My present improvement is for the purpose of obviating previous objections, and by it I can cheaply make a hard and durable artificial stone.

The composition is as follows: Take three parts, by measure, of soluble glass and one part of carbonate of ammonia, and mix it with water, in the proportion of a half pint to four gallons of water. This is used to wet the solid materials, consisting of hydraulic cement, sand, and gravel, in proportions well known to manufacturers of hydraulic-cement artificial stone, and make it into a mortar sufficiently homogeneous and plastic to be formed in molds of the shape desired. This compound readily and quickly hardens, and forms a stone as durable as limestone or other natural stone formations.

Having thus fully described my improvement in manufacturing artificial stone, I claim—

The compound herein described, consisting of the soluble glass and carbonate of ammonia, for mixing the cement with the sand, gravel, &c., into a mortar, for molding into artificial stone, as and for the purposes herein specified.

THOMAS MILLEN.

Witnesses:
J. J. GREENOUGH,
A. JONES.